Oct. 24, 1967  K. MUGELE  3,348,766
DEVICE FOR CLOSING OPENINGS SUCH AS
PRESSURE OPENINGS IN GAS PUMPS
Filed March 23, 1965  2 Sheets-Sheet 1

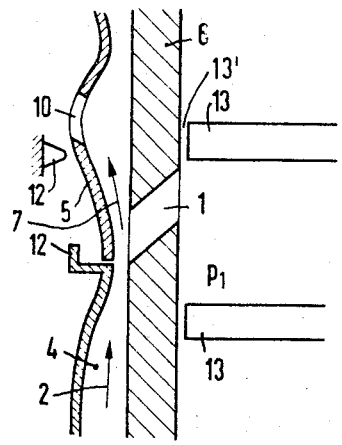
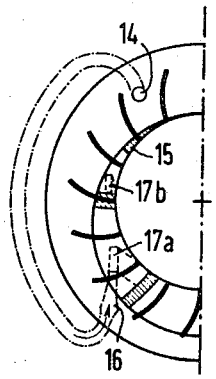
Fig. 8　　　　Fig. 9
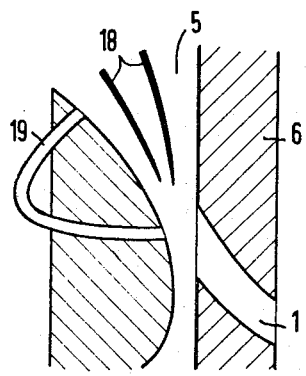
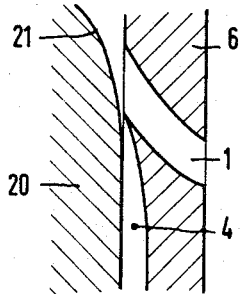
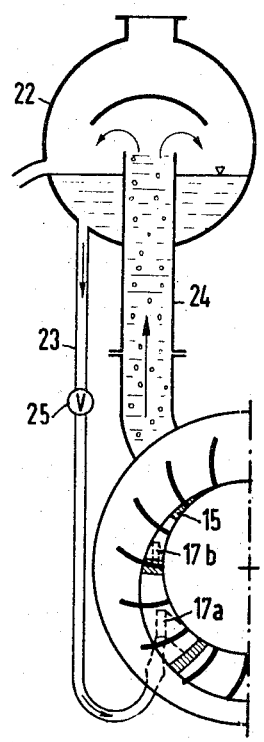
Fig. 10
Fig. 11　　　　Fig. 9a

United States Patent Office 3,348,766
Patented Oct. 24, 1967

3,348,766
DEVICE FOR CLOSING OPENINGS SUCH AS PRESSURE OPENINGS IN GAS PUMPS
Kurt Mugele, Erlangen, Germany, assignor to Siemens-Schuckertwerke Aktiengesellschaft, Berlin-Siemensstadt, Germany, a corporation of Germany
Filed Mar. 23, 1965, Ser. No. 442,078
Claims priority, application Germany, Mar. 25, 1964, S 90,199
15 Claims. (Cl. 230—79)

ABSTRACT OF THE DISCLOSURE

Device for closing an opening has guide means extending transversely to the axis of the opening, and a fluid medium guided past the opening by the guide means at a specific velocity and in a direction defining a specific angle with the axis of the opening so as to sealingly cover the opening, the guide means comprising a wall opposite to and spaced from the opening and extending substantially parallel to the flow direction of the fluid medium.

---

My invention relates to a device for closing openings such as pressure openings in gas pumps, and more particularly, to a device for closing such openings by means of a fluid medium.

It has been known to seal openings, such as the inlet and outlet openings of vane-type pumps, with balls such as in ball valves. It has also been known to produce a valve effect by closing off the openings in the control plates of the pump exhaust chamber with a liquid instead of with mechanical ball valves.

The known devices, however, cannot effectively seal openings such as pressure openings in gas pumps, for example, with a fluid medium, especially when the pressure ratio between both sides of the openings $pe/pa=1$ to 50. Such sealing would facilitate, for example, the construction of single-stage fluid ring gas pumps, particularly for producing high vacuum.

It is accordingly an object of my invention to provide a device for effectively sealing openings where the pressure ratio between both sides of the openings $pe/pa=1$ to 50.

With this and other objects in view and in accordance with my invention, I guide a fluid medium across the opening to be sealed at such an angle and with such velocity that the fluid medium either does not flow into the opening at all and just covers the opening or only flows into the opening to a desired depth so that the opening is sealed off.

In accordance with other, more specific aspects of my invention, I also provide a wall opposite the opening and extending in the direction of flow of the fluid medium, preferably parallel to the axis of the flow. Also in accordance with another aspect of my invention, this wall and the component in which the opening is formed define a channel therebetween and this channel has either a constricted or widened cross section in the vicinity of the opening. In order to have a relatively short over-all length, the channel which is of the diffuser type, in accordance with yet another aspect of my invention, is subdivided by guide plates into separate component channels. In accordance with a further aspect of the invention, the opening which is located opposite the wall decreases in cross section in the direction toward the space that is to be sealed off. According to still another aspect of my invention, I provide several openings to be sealed one behind the other which are covered by a single jet of fluid medium and preferably a wall is spaced from each of the openings and, following at least one of the openings, there is provided a wall or wall portion formed with a passage opening. Also in accordance with my invention, the walls or wall portions located opposite the openings are yieldingly mounted. These walls or wall portions may consist of elastic material and the channel cross section may consequently be variable preferably in the vicinity of the openings which are to be sealed. Further in accordance with my invention, the walls or wall portions which are preferably parallel to the component formed with the openings are displaceable respectively thereto. Additionally, in accordance with my invention, the supply channel for the jet of fluid medium and the diffuser type channel are located either in the part having the openings or in the housing cover of the pump. Also in accordance with my invention, the jet which seals the openings is drawn from the working or advancing medium preferably at a location of the highest pressure. It is furthermore a feature of my invention to selectively open or close the openings by interrupting or reducing the jet, and also in accordance with an aspect of my invention, several jets of fluid medium, preferably acting in the same direction, are employed for sealing the openings.

The features of my invention which are considered as characteristic thereof are set forth in the appended claims.

Although the invention has been illustrated and described as a device for closing openings such as pressure openings in gas pumps, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof, will be best understood from the following description of specific embodiments thereof when read in connection with the accompanying drawings, in which:

FIGS. 1 to 4 are diagrammatic views of four different embodiments of the device for closing openings constructed in accordance with my invention, FIG. 1 illustrating the basic principle, FIG. 2 showing the addition of a wall opposite the opening that is to be sealed, FIG. 3 showing a diffuser-type channel formed at both sides of the wall, and FIG. 4 showing a widening of the channel cross section at the opening which is to be sealed so as best to obtain in pressure valves the largest possible blocking pressure across the opening.

FIG. 8 is a diagrammatic cross-sectional view of a specific disposition of the opening to be sealed as well as a yieldable wall located opposite the opening.

FIGS. 9 and 9a are schematic views of a fluid ring gas pump showing possible means for drawing off or tapping the jet of fluid medium.

FIG. 10 is a diagrammatic enlarged view of a portion of the embodiment shown in FIG. 3 with guide plates located in the diffuser-type channel thereof; and FIG. 11 is a modification of FIG. 10 wherein the supply channel is shown machined in the part having the openings and the diffuser channel in the cover or shield.

Figure 1:
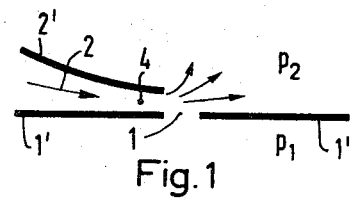

Referring now to the drawings, and first particularly to FIG. 1, there is shown an opening 1 in a wall portion 1', an underpressure $p_1$ being located on one side thereof and a superpressure $p_2$ being located on the other side thereof, for example. The opening 1 may, for example, be the pressure or suction opening of a reciprocating or rotating motor or machine or it may be an opening which is to be sealed in a pipeline or in a container. As discussed hereinafter in this application, the opening is deemed to be in a fluid ring gas pump, it being understood however that the invention is not limited only to such a device. In order to seal the opening 1 and thus prevent a flow from $p_2$ to $p_1$, a jet of fluid medium 2 is provided and is guided past the opening 1 at such a rate of speed and at such a specific angle that the jet medium either doesn't flow at all into the opening 1 and just covers the opening or only flows partly into the opening. It is thus possible, especially by suitably selecting the jet pressure and by suitably shaping the parts to be traversed by the fluid medium, either to close off the opening 1 entirely or, if preferable, for sealing the gap 13' described hereinbelow with regard to FIG. 8, the jet pressure can be so regulated that a suitable portion of the jet can be branched off and guided through the opening to the gap 13' which is to be sealed. The velocity of the jet depends essentially on the size of the opening to be closed and on the jet pressure as well as on the streamlined shape of the portions traversed by the jet medium. The angles formed by the axis of the jet medium and the axis of the opening 1 may differ, the essential characteristic being that the axis of the jet extends parallel to or almost parallel to the surface of the component 1' in which the openings 1 are formed. Tests have shown that under unfavorable flow conditions within a test device, an opening with a jet cross section of 0.3 cm.², a pressure opening cross section of 1.5 cm.² can be sealed off with a liquid jet of $p_3=1.5$ ata. (atmospheres absolute pressure) for a pressure of $p_2=1$ ata. on the one side of the component 1' in which the opening is formed and a pressure $p_1=0.01$ ata. on the other side thereof. These conditions can be improved considerably by suitable shaping of the jet-traversed parts from a streamlining standpoint.

Figure 2:
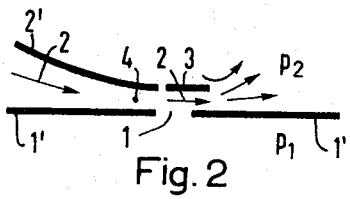
Figure 3:
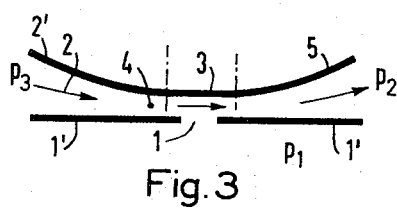

To decrease the flow or turbulence losses, as shown in the embodiment of FIG. 2, a wall 3 is located in the device opposite the opening 1. Although shown in FIG. 2 as being separate from the nozzle-type channel 4, the wall 3 may nevertheless form an integral structural unit therewith if desired. The embodiment schematically shown in FIG. 3 differs from the embodiment in FIG. 2 in that a diffuser 5 is located adjoining the wall 3 which in turn adjoins the nozzle-type channel 4. The diffuser 5 effects a reversion of the kinetic jet energy to pressure energy with minimal losses.

Figure 4:
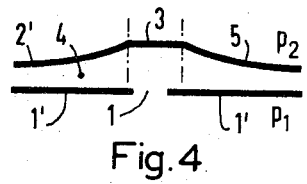

The embodiment schematically shown in FIG. 4 is preferred when the highest possible static pressure is necessary for sealing the opening 1. In the embodiment of FIG. 4, the channel cross section is widened resulting, in accordance with Bernoulli's equation, in an increased pressure in the fluid medium jet. In case the sealing of the opening 1 is to be effected at varying pressures $p_1$, as is the case for example with piston machines, the wall 3 (FIGS. 3 and 4) can be constructed of elastic material. Thus the wall 3 can assume both the positions shown in FIG. 3 and in FIG. 4 as well as any possible intermediate positions. The same effect can be achieved if the wall 3, the wall portion 2' of the nozzle-type channel 4 and the diffuser 5 are displaceable parallel to the wall part or portion 1' in which the opening 1 is formed so that either the wall portion 2' of the nozzle-type channel 4 or the diffuser 5 is located above the opening 1. The actuation of the elastic walls or wall portions or the displacement of these parts parallel or substantially parallel to the wall part 1' in which the opening 1 is formed can be carried out with suitable adjustment members that are not shown in the drawings but which are well known to the man of ordinary skill in the art.

Figure 5:
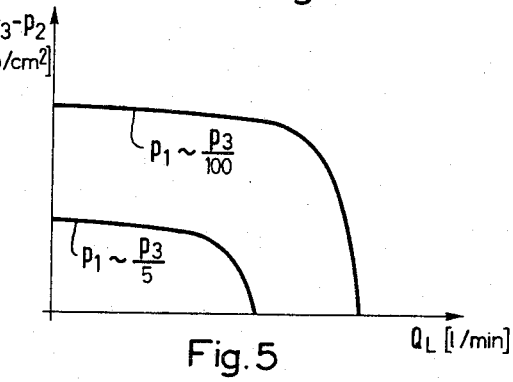
FIG. 5 is a graph or plot diagrammatically showing the blocking action of the jet in which the difference between the inlet and outlet pressures of the jet i.e. the static pressure of the jet, is measured along the ordinate and the fluid leakage loss in liters per minute measured along the abscissa.

FIG. 5 is a plot or diagram in which the pressure difference $p_3-p_2$ (kp./cm.²) is measured along the ordinate and in which the leakage loss quantity $Q_L$ (liters per minute) is measured along the abscissa. The curves shown in the diagram were obtained as a result of a test conducted with the embodiment of FIG. 3 wherein the pressure $p_1$ was smaller than $p_2$. It is apparent that at a specific pressure difference $p_3-p_2$, the amount of leakage loss $Q_L$ abruptly becomes virtually zero.

The diagrammatically illustrated embodiments in FIGS. 6 to 11 are particular adaptations of the basic concept of my invention as applied to a water ring vacuum pump.

Figure 6:
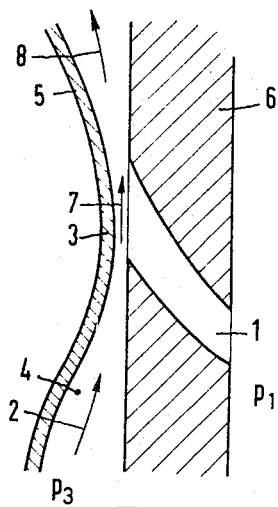
FIG. 6 is a diagrammatic cross-sectional view of a portion of a fluid ring pump showing a preferred shape of the wall portion in the vicinity of the pressure opening.

In FIG. 6 the wall portion in which the opening 1 is formed constitutes the control disc or plate 6 of the vacuum pump. The opening 1 can have either a uniform cross section or can be of the diffuser type, i.e. flaring or tapering. The diffuser type cross section is preferable if it is desired to obtain an increase in pressure when gas is expelled from the working chamber of the pump. The jet medium can consist of water, for example, which, at the location of the jet 2, is supplied at a pressure $p_3$ which is above atmospheric pressure. Due to the channel constriction and the reduced pressure present in the opening 1 i.e. the vacuum pressure $p_1$, the water velocity is increased, which is consequently associated with a reduction in pressure. At the location 7, the pressure in the water jet is substantially the same as the pressure $p_1$. The shape of the diffuser-type wall portion 5 causes the velocity of the water jet to be reduced after it passes the opening 1 which is to be sealed. Consequently, in accordance with Bernoulli's principle, a pressure increase occurs in the water jet, i.e. the kinetic energy of the water jet at the location 7 is virtually changed entirely to pressure energy at location 8.

Figure 7:
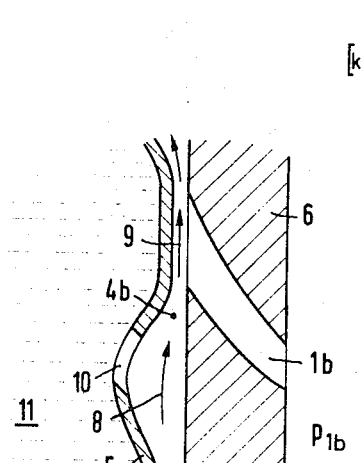
FIG. 7 is a schematic cross-sectional view of a series connection of two closure members.

FIG. 7 shows an embodiment in which the sealing of two pressure openings 1a and 1b is brought about with one jet of water, for example. In actual practice, the number of openings is not necessarily limited to two but may be of a greater number as desired. It is also possible to have a water jet that is composed of several separate jet branches having the same or at least substantially similar direction. At the location 8 in FIG. 7 the water jet has a relatively high pressure energy and low velocity. Since the low pressure $p_{1b}$ in the embodiment of FIG. 7 is present at the opening 1b and the shape of the wall 5 opposite the opening 1b produces a narrowing 4b of the channel cross section, the velocity of the water jet is again increased between location 8 and the location 9 and especially in accordance with Bernoulli's principle since the pressure $p_{1b}$ is below the fluid pressure at the location 8.

In the embodiments of FIGS. 6 and 7, the openings 1, 1a and 1b are to be sealed off. As long as the pump operates in a suction pressure region which effects an increase in the pressure 1, 1a and 1b above the pressure $p_3$, the jet 2 is interrupted due to the greater pressure of the gas to be ejected from the working chamber. The channel cross sections at the locations 7 and 9 serve to promote the escape of the gases or the gas-water mixture discharging from the working chamber of the pump. With a series connection of openings such as the openings 1a and 1b in the embodiment of FIG. 7, a passage-opening 10 is provided at the widest location of the jet flow channel. This reduces the throttle losses and turbulence losses during the ejection of the gas or gas-water mixture from the working chamber of the pump into, for example, the lateral shield pocket 11 which is filled with water for example, and furthermore, there is no hindrance to the gas discharge through the opening 1b. The opening and closing of the openings 1a and 1b can also be effected by interrupting the fluid medium jet 2 or reducing its flow.

Since larger quantities of water must flow occasionally through the pressure openings in water ring vacuum pumps, the wall of the diffuser 5 in the embodiment of FIG. 8 is constructed so that it can be moved in order to prevent high throttling losses. Whenever a very large quantity of water besides the conveyance gas is ejected through the pressure opening 1, the wall 5 is displaced toward the left-hand side of FIG. 8 and abuts against the stops 12, consequently opening up a considerably larger outlet cross section at the location 7. Furthermore, the opening 1 is so located in the control disc 6 that a portion of the sealing water jet 2, in the case where the pressure $p_1$ is below the jet pressure $p_3$, is deflected with a high velocity into the opening 1 and thereby penetrates into the gap 13′ located between the control disc 6 and the rotor blades 13 of the pump, and consequently seals the gap.

In FIG. 9 there is shown an embodiment in which the water jet which is used for sealing the pressure openings, is derived from the water ring located in the pump. As shown in FIG. 9, an outlet opening 14 is provided in the control disc and is preferably located so that it is radially aligned with the last pressure opening 15, since the highest pressure of the water ring is present at this location. The nozzle 16 corresponds to the nozzle-type channel 4 in the embodiment of FIG. 7. The openings 17a and 17b shown in dotted lines in FIG. 9 correspond respectively to the openings 1a and 1b shown in FIG. 7. Of course, more than one nozzle 16 can be provided with water from the outlet opening 14 or other outlet openings from the pump water ring so as to direct a plurality of jets across the openings 17a and 17b.

In the embodiment of FIG. 9a the water which is required for the jet is shown as being derived, for example, from the water separator 22 of the pump. The necessary static super pressure of the jet arises here due to the greater specific weight of the water column in the return line 23 as compared to the gas-water mixture column in the pressure line 24. A suitable control valve 25 can be provided in the line 23 for interrupting or reducing the flow of the water for the jet.

FIG. 10 shows an embodiment of my invention which has a relatively short over-all length. For this purpose, the diffuser-type widened portion 5 is subdivided by guide plates 18. Instead of or supplementary to such guide plates, a marginal suction duct 19 can be provided in a known manner at the diffuser.

FIG. 11 shows an embodiment of the invention in which the nozzle-type channel 4 is formed, for example by machining, in the control plate 6. This nozzle-type channel, however, can also be formed in the cover or lateral shield 20 of the pump.

The diffuser-type widened portion 21 is shown in FIG. 11 as formed in the cover or lateral shield 20 of the pump but may also be formed instead in the control plate thereof.

The embodiments constructed in accordance with my invention have a primary advantage over the known devices which results from their simple construction and consequent minimal wear and tear. My invention furthermore affords the opportunity to construct single-stage fluid ring gas pumps, and more particularly fluid ring vacuum pumps without mechanical valves for high and low pressure conditions and preferably for a pressure ratio $pe/pa = 1$ to 50.

I claim:

1. Device for closing an opening comprising guide means extending transversely to the axis of the opening, and a fluid medium guided past said opening by said guide means at a specific velocity and in a direction defining a specific angle with the axis of the opening so as to sealingly cover the opening, said guide means comprising a wall opposite to and spaced from the opening and extending substantially parallel to the flow direction of said fluid medium.

2. Device for closing an opening formed in a member, said device comprising guide means extending transversely to the axis of the opening, and a fluid medium guided past the opening by said guide means at a specific velocity and in a direction defining a specific angle with the axis of the opening so as to sealingly cover the opening, said guide means including a wall located opposite to and spaced from the opening and extending substantially parallel to the flow direction of said fluid medium, the member in which the opening is formed and said wall defining a channel there-between, said channel, in the vicinity of the opening, having a decreasing cross-sectional area in the flow direction of the fluid medium.

3. Device for closing an opening formed in a member, said device comprising guide means extending transversely to the axis of the opening, and a fluid medium guided past the opening by said guide means at a specific velocity and in the direction defining a specific angle with the axis of the opening so as to sealingly cover the opening, said guide means including a wall located opposite to and spaced from the opening and extending substantially parallel to the flow direction of said fluid medium, the member in which the opening is formed and said wall defining a channel therebetween, said channel, in the vicinity of the opening, having an increasing cross-sectional area in the flow direction of the fluid medium.

4. Device for closing an opening formed in a member, said device comprising guide means extending transversely to the axis of the opening, and a fluid medium guided past the opening by said guide means at a specific velocity and in a direction defining a specific angle with the axis of the opening so as to sealingly cover the opening, said guide means including a wall located opposite to and spaced from the opening and extending substantially parallel to the flow direction of said fluid medium, the member in which the opening is formed and said wall defining a channel therebetween, said channel, in the vicinity of the opening, comprising respective portions having a decreasing cross-sectional area and an increasing cross-sectional area in the flow direction of the fluid medium.

5. Device for closing an opening formed in a member, said device comprising guide means extending transversely to the axis of the opening, and a fluid medium guided past the opening by said guide means at a specific velocity and in a direction defining a specific angle with the axis of the opening so as to sealingly cover the opening, said guide means including a wall located opposite to and spaced from the opening and extending substantially parallel to the flow direction of said fluid medium, the member in which the opening is formed and said wall defining a channel therebetween, said channel having a diffuser portion of increasing cross-sectional area in the flow direction of said fluid medium, and at least one guide plate located in said diffuser portion and extending in said flow direction for subdividing said channel into a plurality of separate subchannels.

6. Device for closing an opening formed in a member, said device comprising guide means extending transversely to the axis of the opening, and a fluid medium guided past the opening by said guide means at a specific velocity and in a direction defining a specific angle with the axis of the opening so as to sealingly cover the opening, said guide means including a wall located opposite to and spaced from the opening and extending substantially parallel to the flow direction of said fluid medium, the member in which the opening is formed and said wall defining a channel therebetween, the opening formed in the member having a decreasing cross-sectional area in a direction extending away from said wall.

7. Device for closing a plurality of spaced openings formed in a member, said device comprising guiding wall means extending transversely to the respective axes of the openings, and a fluid medium jet guided by said guiding wall means at a specific velocity and in a direction defining a specific angle with the axes of the openings so as to sealingly cover the openings, said guiding wall means including a wall portion located opposite to and spaced from each of the openings and a wall portion located downstream of at least one of the openings and formed with a passage opening.

8. Device for closing an opening formed in a member, said device comprising guide means extending transversely to the axis of the opening, and a fluid medium guided past the opening by said guide means at a specific velocity and in a direction defining a specific angle with the axis of the opening so as to sealingly cover the opening, said guide means including a wall located opposite to and spaced from the opening and extending substantially parallel to the flow direction of said fluid medium, the member in which the opening is formed and said wall defining a channel therebetween, said wall being yieldable for varying the cross-sectional area of said channel.

9. Device for closing an opening formed in a member, said device comprising guide means extending transversely to the axis of the opening, and a fluid medium guided past the opening by said guide means at a specific velocity and in a direction defining a specific angle with the axis of the opening so as to sealingly cover the opening, said guide means including a wall located opposite to and spaced from the opening and extending substantially parallel to the flow direction of said fluid medium, the member in which the opening is formed and said wall defining a channel therebetween, said wall consisting of elastic material and being yieldable for varying the channel cross section at least in the vicinity of the opening.

10. Device for closing an opening formed in a member, said device comprising guide means extending transversely to the axis of the opening, and a fluid medium guided past the opening by said guide means at a specific velocity and in a direction defining a specific angle with the axis of the opening so as to sealingly cover the opening, said guide means including a wall located opposite to and spaced from the opening and extending substantially parallel to the flow direction of said fluid medium, the member in which the opening is formed and said wall defining a channel there-between, said guide means consisting at least in part of elastic material and being yieldingly displaceable for varying the cross-sectional area of said channel in the vicinity of the opening.

11. Device for closing an opening formed in a member, said device comprising guide means extending transversely to the axis of the opening, and a fluid medium guided past the opening by said guide means at a specific velocity and in a direction defining a specific angle with the axis of the opening so as to sealingly cover the opening, said guide means including a wall located opposite to and spaced from the opening and extending substantially parallel to the flow direction of said fluid medium, the member in which the opening is formed and said wall defining a channel therebetween, said guide means, at least in part, being substantially parallel to the member formed with the opening and being displaceable relative to the member.

12. Device for closing an opening formed in a member, said device comprising guide means extending transversely to the axis of the opening, and a fluid medium guided past the opening by said guide means at a specific velocity and in a direction defining a specific angle with the axis of the opening so as to sealingly cover the opening, said guide means including a wall located opposite to and spaced from the opening and extending substantially parallel to the flow direction of said fluid medium, the member in which the opening is formed and said wall defining a channel therebetween, said wall being substantially parallel to the member formed with the opening and being displaceable relative to the member.

13. In a pump having a control plate member formed with an opening and a pump cover member, a device for closing the opening comprising guide means formed in one of the members and extending transversely to the axis of the opening, and a fluid medium jet guided past the opening by said guide means at a specific velocity and in a direction defining a specific angle with the axis of the opening so as to sealingly cover the opening, said guide means defining with the other of the members a supply channel toward the opening and a diffuser channel away from the opening.

14. In a pump having, during operation, a working fluid medium at a location of substantially maximum pressure and having a control plate formed with an opening, a device for closing the opening comprising guide means extending transversely to the axis of the opening, a fluid medium jet drawn from the working fluid medium at the location of substantially maximum pressure and guided past the opening by said guide means at a specific velocity and in a direction defining a specific angle with the axis of the opening so as to sealingly close the opening.

15. Device for blocking an opening comprising guide means extending from a location of higher pressure to a location of lower pressure transversely to the axis of the opening, and a fluid medium guided past said opening by said guide means in a jet of specific cross section and at a specific velocity so that the static pressure at said opening, in accordance with Bernoulli's equation, is a smaller than at said location of higher pressure.

References Cited

UNITED STATES PATENTS

| | | | |
|---|---|---|---|
| 3,135,291 | 6/1964 | Kepler et al. | 60—231 X |
| 3,143,856 | 8/1964 | Hausmann | 60—231 X |

ROBERT M. WALKER, *Primary Examiner.*